J. A. POIRIER.
NUT LOCK.
APPLICATION FILED MAY 27, 1910.
969,655.
Patented Sept. 6, 1910.
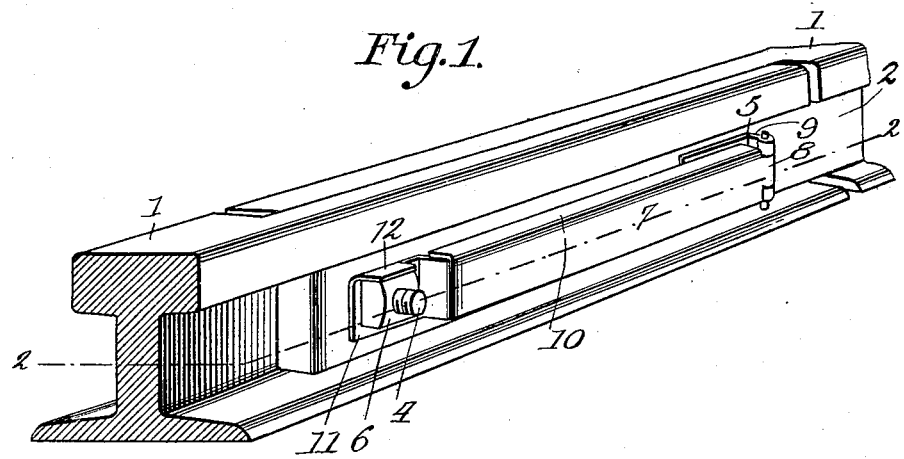
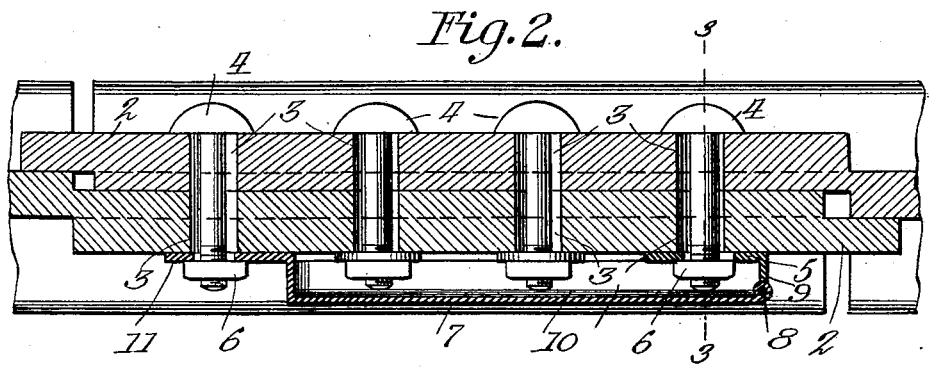
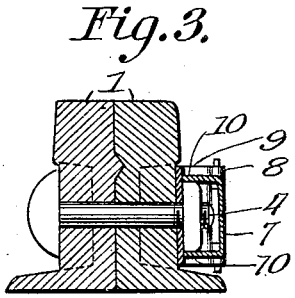
Witnesses
Phil E Barnes
N. C Healy
Inventor
J. A. Poirier,
By James Sheehy
Attorney

UNITED STATES PATENT OFFICE.

JOSEPH A. POIRIER, OF WOONSOCKET, RHODE ISLAND.

NUT-LOCK.

969,655.

Specification of Letters Patent. Patented Sept. 6, 1910.

Application filed May 27, 1910. Serial No. 563,746.

*To all whom it may concern:*

Be it known that I, JOSEPH A. POIRIER, a subject of the King of Great Britain, residing at Woonsocket, in the county of Providence and State of Rhode Island, have invented new and useful Improvements in Nut-Locks, of which the following is a specification.

My invention relates to improvements in nut locks, and it consists in the constructions, combinations and arrangements herein described and claimed.

An object of my invention is to provide an improved nut lock adapted to all constructions in which a series, or plurality, of nuts are employed.

A further object of my invention is to provide a simple and compact nut lock constructed to securely lock the nuts in position, to permit convenient inspection and adjustment of the nuts at all times.

My invention is especially adapted for railway rail joints, but is capable of highly advantageous use in any construction having a series of nuts.

Referring to the drawings forming part of this specification and in which similar reference symbols indicate corresponding parts in the several views: Figure 1 shows one embodiment of my invention applied to a railway joint. Fig. 2 is a sectional view on the line 2—2 of Fig. 1. Fig. 3 is a section on the line 3—3 of Fig. 2.

Referring to the drawings: 1 indicates a pair of rails having their overlapping ends 2 provided with a series of elongated apertures 3 for receiving a plurality of clamping bolts 4. A base plate 5 is provided with an aperture for receiving the initial bolt of the series, and is securely clamped beneath the nut 6 of said bolt. A swing plate 7 is hinged at 8 to an upturned flange 9 on the base plate, and provided with locking flanges 10 for lockingly engaging any desired number of the nuts less than the entire series. I have shown said flanges adapted to so engage all of the nuts except the final one of the series. The swing plate 7 is shown provided with an apertured offset portion 11, adapted to receive the final bolt of the series and to be rigidly clamped under the nut 6 thereof. The offset portion 11 is provided with a flange 12 adapted to be bent into locking engagement with the final nut 6 of the series, thereby securely locking said final nut against accidental shifting.

From the above description, it will be seen that my invention provides a simple and compact construction capable of efficient operation with any desired number of nuts, and adapted to permit convenient inspection and adjustment of the several nuts at all times.

The railway rail joint disclosed herein constitutes the subject matter of my contemporary application of even date herewith, Serial Number 563,747.

Having described my invention, what I claim and desire to secure by Letters-Patent, is:

1. Means for locking a series of nuts, comprising a swing plate constructed to lockingly engage a plurality of the nuts, an apertured offset on said plate adapted to be clamped under the final nut of the series, and a flange on said offset for lockingly engaging said final nut of the series.

2. Means for locking a series of nuts, comprising an apertured base plate constructed to be clamped by an initial nut of the series, a swing plate pivotally secured to said base plate and provided with an offset adapted to be clamped by the final nut of the series, and flanges carried by said plate for lockingly engaging the several nuts of the series.

3. Means for locking a series of nuts, comprising a swing plate pivotally secured by the initial nut of the series and arranged under and clamped in position by the final nut of the series; said plate being flanged for lockingly engaging the several nuts of the series.

In testimony whereof I have hereunto set my hand in presence of two subscribing witnesses.

JOSEPH A. POIRIER.

Witnesses:
EVELYN W. SPAULDING,
EDGAR L. SPAULDING.